(12) United States Patent
Konde et al.

(10) Patent No.: US 8,961,019 B2
(45) Date of Patent: Feb. 24, 2015

(54) FLOW CONTROL THROUGH THRUST BEARING ASSEMBLY

(75) Inventors: Parag Konde, Spring, TX (US);
Srinivas Likki, Sugar Land, TX (US);
James Layne Larsen, Spring, TX (US);
Dwayne P. Terracina, Spring, TX (US);
Andrew Grebe, Tomball, TX (US)

(73) Assignee: Smith International, Inc., Houston, TX (US)

( * ) Notice: Subject to any disclaimer, the term of this patent is extended or adjusted under 35 U.S.C. 154(b) by 10 days.

(21) Appl. No.: 13/104,595

(22) Filed: May 10, 2011

(65) Prior Publication Data
US 2012/0288226 A1    Nov. 15, 2012

(51) Int. Cl.
| F16C 17/04 | (2006.01) |
| F16C 3/14 | (2006.01) |
| F16C 33/10 | (2006.01) |
| F16C 33/26 | (2006.01) |
| G06F 17/50 | (2006.01) |

(52) U.S. Cl.
CPC ............. *F16C 33/1045* (2013.01); *F16C 17/04* (2013.01); *F16C 33/26* (2013.01); *G06F 17/5009* (2013.01); *G06F 2217/16* (2013.01); *Y02T 10/82* (2013.01)
USPC ........... 384/368; 384/303; 384/316; 384/397; 384/317

(58) Field of Classification Search
CPC .. F16C 17/04; F16C 33/1025; F16C 33/1045; F16C 33/26; E21B 10/22–10/24
USPC .......... 175/92, 107; 384/92, 95–97, 121, 123, 384/192, 282–293, 452–455, 317, 303–308, 384/907.1, 316, 368, 397
See application file for complete search history.

(56) References Cited

U.S. PATENT DOCUMENTS

| 1,418,804 | A | * | 6/1922 | Kane ............................. 384/306 |
| 3,043,637 | A | | 7/1962 | Biedendieck et al. |
| 3,054,595 | A | | 9/1962 | Kaufmann |
| 3,583,502 | A | | 6/1971 | Henderson |
| 3,594,106 | A | | 7/1971 | Garrison |
| 3,720,274 | A | | 3/1973 | McCallum |

(Continued)

FOREIGN PATENT DOCUMENTS

WO    WO 2009151608 A1 * 12/2009

OTHER PUBLICATIONS

"Load-Responsive Hydrodynamic Bearing for Downhole Drilling Tools" M. S. Kalsi et al., Journal of Tribology, Jan. 2007, vol. 129, pp. 209-217 (9 pages).

(Continued)

*Primary Examiner* — Alan B Waits
(74) *Attorney, Agent, or Firm* — Osha Liang LLP

(57) ABSTRACT

A bearing assembly comprising a frame; a rotating disc disposed in the frame, the rotating disc comprising a first set of inserts; and a fixed disc disposed in the frame, the fixed disc comprising a second set of inserts, the second set of inserts configured to interact with the first set of inserts, and a lip disposed adjacent the second set of inserts. Also, a bearing assembly comprising a frame; a rotating disc disposed in the frame, the rotating disc comprising a first set of inserts and at least one groove disposed axially above at least one of the inserts; and a fixed disc disposed in the frame, the fixed disc comprising a second set of inserts, the second set of inserts configured to interact with the first set of inserts.

10 Claims, 10 Drawing Sheets

(56) References Cited

U.S. PATENT DOCUMENTS

| | | |
|---|---|---|
| 3,807,745 A | 4/1974 | Bent |
| 3,838,953 A | 10/1974 | Peterson |
| 3,879,094 A | 4/1975 | Tschirky et al. |
| 3,885,838 A | 5/1975 | Childers et al. |
| 3,894,818 A | 7/1975 | Tschirky |
| RE28,625 E | 11/1975 | Cunningham |
| 3,971,600 A | 7/1976 | Murdoch et al. |
| 4,114,704 A | 9/1978 | Maurer et al. |
| 4,136,748 A | 1/1979 | Dickerhoff |
| 4,190,301 A | 2/1980 | Lachonius et al. |
| 4,193,463 A | 3/1980 | Evans |
| 4,198,104 A | 4/1980 | Crase |
| 4,199,201 A | 4/1980 | Trzeciak |
| 4,260,032 A | 4/1981 | Fox |
| 4,298,073 A | 11/1981 | Yates |
| 4,323,284 A | 4/1982 | Childers et al. |
| 4,329,127 A | 5/1982 | Tschirky et al. |
| 4,330,158 A | 5/1982 | Walters |
| 4,333,691 A | 6/1982 | Cooper |
| 4,340,334 A | 7/1982 | Nixon |
| 4,361,194 A | 11/1982 | Chow et al. |
| T102,901 I4 | 4/1983 | Offenbacher |
| 4,386,668 A | 6/1983 | Parish |
| 4,410,054 A * | 10/1983 | Nagel et al. ............... 175/107 |
| 4,410,284 A | 10/1983 | Herrick |
| 4,413,918 A | 11/1983 | Thomas |
| 4,416,554 A | 11/1983 | Pribbenow |
| 4,427,079 A | 1/1984 | Walter |
| 4,453,604 A | 6/1984 | Ioanesian et al. |
| 4,453,836 A | 6/1984 | Klima |
| 4,501,454 A | 2/1985 | Dennis et al. |
| 4,511,193 A | 4/1985 | Geczy |
| 4,533,003 A | 8/1985 | Bailey et al. |
| 4,552,232 A | 11/1985 | Frear |
| 4,560,014 A * | 12/1985 | Geczy ............... 175/107 |
| 4,572,306 A | 2/1986 | Dorosz |
| 4,597,456 A | 7/1986 | Ecer |
| 4,620,601 A | 11/1986 | Nagel |
| 4,657,091 A | 4/1987 | Higdon |
| 4,671,368 A | 6/1987 | Burr |
| 4,720,199 A | 1/1988 | Geczy et al. |
| 4,732,491 A | 3/1988 | Geczy |
| 4,738,323 A | 4/1988 | Mathews |
| 4,749,053 A | 6/1988 | Hollingshead |
| 4,753,556 A | 6/1988 | Solko |
| 4,880,065 A | 11/1989 | McDonald et al. |
| 4,978,257 A | 12/1990 | Nowman |
| 5,007,490 A | 4/1991 | Ide |
| 5,022,471 A | 6/1991 | Maurer et al. |
| 5,037,212 A | 8/1991 | Justman et al. |
| 5,078,558 A | 1/1992 | Arai et al. |
| 5,086,851 A | 2/1992 | Beasley |
| 5,137,097 A | 8/1992 | Fernandez |
| 5,248,204 A | 9/1993 | Livingston et al. |
| 5,269,383 A | 12/1993 | Forrest |
| 5,307,887 A | 5/1994 | Welsh |
| 5,364,192 A | 11/1994 | Damm et al. |
| 5,368,398 A * | 11/1994 | Damm et al. ............... 384/304 |
| 5,480,233 A | 1/1996 | Cunningham |
| 5,485,891 A | 1/1996 | Vladimirovich et al. |
| 5,498,081 A * | 3/1996 | Dennis et al. ............... 384/95 |
| 5,527,220 A | 6/1996 | Geczy |
| 5,628,375 A | 5/1997 | Daly |
| 5,725,313 A | 3/1998 | Singh et al. |
| 5,997,223 A | 12/1999 | Kosmowski |
| 6,050,346 A | 4/2000 | Hipp |
| 6,109,790 A | 8/2000 | von Gynz-Rekowski et al. |
| 6,247,705 B1 | 6/2001 | Yang et al. |
| 6,247,706 B1 | 6/2001 | Kuo |
| 6,354,740 B1 | 3/2002 | Singh et al. |
| 6,439,866 B1 | 8/2002 | Farkas et al. |
| 6,488,103 B1 | 12/2002 | Dennis et al. |
| 6,629,571 B1 | 10/2003 | Downie |
| 7,104,698 B1 | 9/2006 | Van Drentham-Susman |
| 7,552,782 B1 * | 6/2009 | Sexton et al. ............... 175/107 |
| 7,559,695 B2 | 7/2009 | Sexton et al. |
| 2004/0031625 A1 | 2/2004 | Lin et al. |
| 2004/0200640 A1 | 10/2004 | Rives |
| 2006/0278439 A1 * | 12/2006 | Ide ............... 175/107 |
| 2007/0081747 A1 | 4/2007 | Dick et al. |
| 2007/0284150 A1 | 12/2007 | Lin |
| 2008/0029304 A1 | 2/2008 | LeBlanc et al. |
| 2008/0190669 A1 | 8/2008 | Cioceanu |
| 2008/0245577 A1 | 10/2008 | Zahradnik et al. |
| 2009/0205873 A1 | 8/2009 | Dick et al. |
| 2009/0272581 A1 | 11/2009 | Beylotte et al. |

OTHER PUBLICATIONS

"Load on the thrust bearings of downhole screw motors" Xie Zhuzhuang China Petroleum Machinery, vol. 21 No. 3, Mar. 1993 (19 pages).

"Polycrystalline diamond thrust bearings for down-hole oil and gas drilling tools" T. N. Sexton et al., USA Wear; vol. 267, Issues 5-8, Jun. 2009, pp. 1041-1045 17th International Conference on Wear of Materials (5 pages).

"Downhole Pneumatic Turbine Motor: Testing and Simulation Results" W. C. Lyons et al., New Mexico Inst. of Mining and Technology Journal: SPE Drilling Engineering Volume: vol. 5, No. 3, Sep. 1990 pp. 239-246 (8 pages).

"Design and test of a magnetic thrust bearing" P. E. Allaire et al., Journal of the Franklin Institute vol. 326, Issue 6, 1989, pp. 831-847 (17 pages).

"Construction optimum and analysis on capacity of support loads of three thrust bearings used in turbodrill" Xu Fu-dong et al., Mechinery Engineering Institute of Yangtze University, Jingzhou, China Oil Field Equipment May 2004 (12 pages).

* cited by examiner

FLOW CONTROL THROUGH THRUST BEARING ASSEMBLY

BACKGROUND

1. Field of the Invention

Embodiments disclosed herein relate to apparatuses and methods for controlling fluid flow and erosion/cooling of bearing assembly components. More specifically, embodiments disclosed herein relate to apparatuses and methods for controlling fluid flow and erosion/cooling of bearing assembly components through modification of the bearing components or housing of the bearing.

2. Background Art

Drilling motors are commonly used to provide rotational force to a drill bit when drilling earth formations. Drilling motors used for this purpose are typically driven by drilling fluids pumped from surface equipment through the drillstring. This type of motor is commonly referred to as a mud motor. In use, the drilling fluid is forced through the mud motor(s), which extracts energy from the flow to provide rotational force to a drill bit located below the mud motors. There are two primary types of mud motors: positive displacement motors ("PDM") and turbodrills.

FIG. 1 shows a prior art turbodrill which is used to provide rotational force to a drill bit. A housing 45 includes an upper connection 40 to connect to the drillstring (not shown). Turbine stages 80 are disposed within the housing 45 to rotate a shaft 50. A stage in this context may be defined as a mating set of rotating and stationary parts. A turbine stage typically includes a bladed rotor (not shown) and a bladed stator (not shown). At a lower end of the turbodrill, a drill bit 90 is attached to the shaft 50 by a lower connection (not shown). A radial bearing 70 is provided between the shaft 50 and the housing 45. Stabilizers 60 and 61 disposed on the housing 45 help to keep the turbodrill centered within the wellbore. A turbodrill uses turbine stages 80 to provide rotational force to drill bit 90. In operation, drilling fluid is pumped through a drillstring (not shown) until it enters the turbodrill. The drilling fluid passes through a rotor/stator configuration of turbine stages 80, which rotates shaft 50 and ultimately drill bit 90.

While providing rotational force to the shaft 50 through the rotor (not shown), the turbine stages 80 also produce a downward axial force (thrust) from the drilling fluid. Upward axial force results from the reaction force of the drill bit 90, also called weight on bit "WOB." To transfer axial loads between the housing 45 and the shaft 50, thrust bearings 10 are provided. As shown in FIG. 2A, multiple stages of thrust bearings 110 are "stacked" in series; FIG. 2A shows a portion of a bearing stack in which four bearing stages can be seen. A bearing stage in this context may comprise a rotating bearing subassembly and a stationary bearing subassembly. A bearing subassembly as defined herein may simply comprise the bearing itself, for example a bearing comprised of polycrystalline diamond compacts inserted into a ring, or may additionally comprise components, including but not limited to spacers, frames, wear plates, pins, and springs.

It is necessary to positionally arrange the bearing stages in series in order to fit them within the confines of the turbodrills tubular body. Though the bearing stages are positionally in series, the axial load, at least in principle, is carried in parallel by the bearing stages and shared to some extent by each bearing stage. The bearing stages are held in position in the stacks by axial compression. The primary purposes of compression are to allow the components to transfer torque and to provide a sealing force between components. The compression may be maintained by threaded components on one or both ends of the inner and outer bearing stacks. In a free, uncompressed state, all stage lengths may be nominally equal. Ideally, all stages have identical lengths so the load is distributed evenly among all stages.

A limitation of prior art bearings has been balancing the requirement to cool the bearing with the negative effects of erosion of the thrust bearing components. In circumstances where there is not enough flow through the bearing surfaces, inadequate cooling may cause the bearing to premature fail. In circumstances where there is too high an amount of fluid flowing through the bearing, erosion on the bearing surfaces has been observed, which may also result in premature failure.

Referring to FIG. 2B, a cross-sectional view of a thrust bearing is shown. In such thrust bearings, the bearing includes a rotating disc 200 and a fixed disc 201. Each disc 200, 201 may include inserts 203 formed from ceramic, PDC, or similar materials. During use, fluid is flossed through the bearings along path A, such that fluid is allowed to flow between inserts 203 and along outer housing 204.

Referring to FIG. 2C, a fluid flow schematic of fluid flowing through the thrust bearing of FIG. 2B is shown. As may be seen at Region B, the fluid along flat section 205 of fixed disc 201 may cause recirculation. The recirculation may result in erosion to the flat section 205.

Accordingly, there exists a need for improved bearing design for controlling cooling and erosion.

SUMMARY OF THE DISCLOSURE

In one aspect, embodiments disclosed herein relate to a bearing assembly comprising a frame; a rotating disc disposed in the frame, the rotating disc comprising a first set of inserts; and a fixed disc disposed in the frame, the fixed disc comprising a second set of inserts, the second set of inserts configured to interact with the first set of inserts, and a lip disposed adjacent the second set of inserts.

In another aspect, embodiments disclosed herein relate to a bearing assembly comprising a frame; a rotating disc disposed in the frame, the rotating disc comprising a first set of inserts and at least one groove disposed axially above at least one of the inserts; and a fixed disc disposed in the frame, the fixed disc comprising a second set of inserts, the second set of inserts configured to interact with the first set of inserts.

In another aspect, embodiments disclosed herein relate to a bearing assembly comprising a frame; a rotating disc disposed in the frame, the rotating disc comprising a first set of inserts; and a fixed disc disposed in the frame, the fixed disc comprising a second set of inserts, the second set of inserts configured to interact with the first set of inserts and wherein the fixed disc comprises a chamfer.

In another aspect, embodiments disclosed herein relate to a bearing assembly comprising a frame; a rotating disc disposed in the frame, the rotating disc comprising a first set of inserts; and a fixed disc disposed in the frame, the fixed disc comprising a second set of inserts, the second set of inserts configured to interact with the first set of inserts and wherein the fixed disc comprises a chamfer.

In another aspect, embodiments disclosed herein relate to a bearing assembly comprising a frame; a rotating disc disposed in the frame, the rotating disc comprising a first set of inserts; and a fixed disc disposed in the frame, the fixed disc comprising a second set of inserts, the second set of inserts configured to interact with the first set of inserts; wherein at least one of the frame, the rotating disc, and the fixed disc comprises a fluid control feature.

Other aspects and advantages of the invention will be apparent from the following description and the appended claims.

DETAILED DESCRIPTION

In one aspect, embodiments disclosed herein relate generally to apparatuses and methods for controlling fluid flow and erosion/cooling of bearing assembly components. In other aspects, embodiments disclosed herein relate to apparatuses and methods for controlling fluid flow and erosion/cooling of bearing assembly components through modification of the bearing components or housing of the bearing.

Figure 3A:
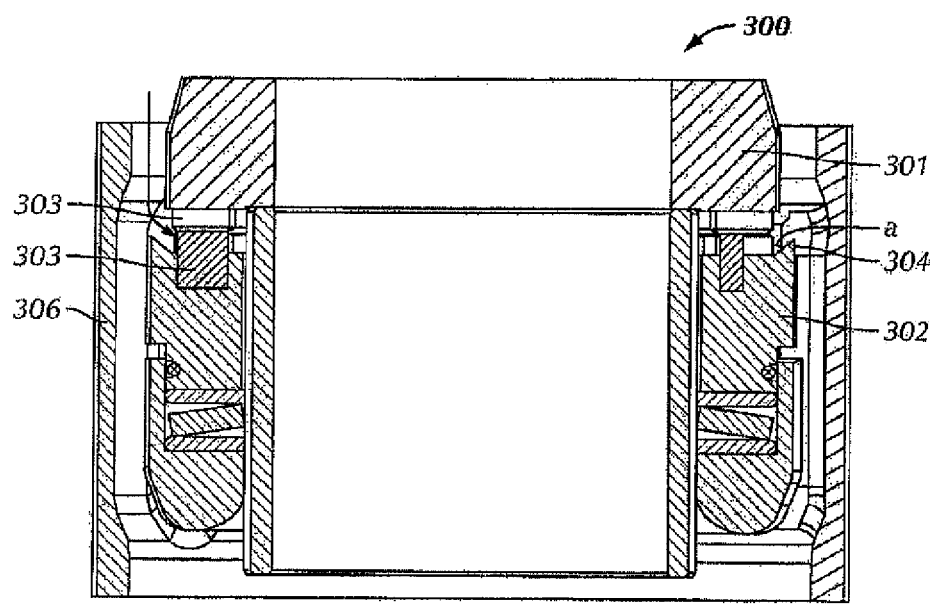
FIG. 3A is a cross-section view of a bearing assembly according to embodiments of the present disclosure.

Referring to FIG. 3A, a thrust bearing assembly according to embodiments of the present disclosure is shown. In this embodiment, thrust bearing assembly 300 includes a first disc 301 and a second disc 302. In certain embodiments, the first disc 301 may be a rotating disc, while second disc 302 may be a fixed disc. In alternative embodiments, the first disc 30 a may be a fixed disc, while the second disc 302 may be a rotating disc. In certain embodiments, the orientation of the first and second discs 301 and 302 and the determination of which disc is fixed versus rotating will depend on the direction of flow through the bearing assembly. For example, as fluid flows in direction A, axially downward through the bearing assembly, the fluid flows past the first rotating disc 301 to the second fixed disc 302. In alternate embodiments the direction of flow may be reversed and/or the orientation of first and second discs 301 and 302, as well as which disc rotates and which disc is fixed, may vary. Those of ordinary skill in the art will appreciate that the relative orientation of first and second discs 301 and 302 and the determination of whether first or second disc 301 or 302 rotates or is fixed will depend on the requirements of a particular thrust bearing assembly and/or drilling tool.

Both first disc 301 and second disc 302 have a wear resistant surface 303 disposed thereon. Those of ordinary skill in the art will appreciate that wear resistant surfaces 303 may be formed from a variety of materials, such as ceramics, PDC, or other materials having material properties making wear resistant surfaces 303 resistant to abrasive wear. In certain embodiments, the wear resistant surface 303 may be formed of a variety of hard or ultra-hard particles. In one embodiment, the wear resistant surface 303 may be formed from a suitable material such as tungsten carbide, tantalum carbide, or titanium carbide. Additionally, various binding metals may be included in the substrate, such as cobalt, nickel, iron, metal alloys, or mixtures thereof. In such wear resistant surfaces 303, the metal carbide grains are supported within the metallic binder, such as cobalt. Additionally, the wear resistant surface 303 may be formed of a sintered tungsten carbide composite structure. It is well known that various metal carbide compositions and binders may be used, in addition to tungsten carbide and cobalt. Examples of other hard and ultra-hard materials that may be used include polycrystalline diamond, thermally stable diamond, natural diamond, a diamond/silicon carbide composite, and cubic boron nitride.

In this embodiment, wear resistant surfaces 303 include a plurality of inserts. Thus, the inserts may be formed from the materials discussed above. In alternate embodiments, wear resistant surfaces 303 may include a substantially continuous sleeve, such as a ceramic sleeve. In still other embodiments, the substantially continuous sleeve may be formed from various other hard and ultra-hard materials, as discussed above.

Wear resistant surfaces 303 may be disposed circumferentially around first disc 301 and second disc 302. In an embodiment where the wear resistant surfaces 303 include a plurality of inserts a first set of inserts may be disposed on first disc 301 and a second set of inserts may be disposed on second disc 302. The inserts of the first and second sets may be disposed so individual inserts 303 of the first and second sets contact during use of the tool in which the bearing assembly is disposed.

In this embodiment, second disc 302 also includes a lip 304 disposed around the periphery of the second disc 302. As illustrated, lip 304 may include an angled protrusion extending longitudinally upward. Those of ordinary skill in the art will appreciate that a lip angle α may be formed as lip 304 extends from second disc 302. By varying lip angle α, as well as the length of the protrusion, flow through wear resistant surfaces 303 and between second disc 302 and a frame 306 may be adjusted. For example, by increasing the length of lip 304 and/or increasing lip angle α, the volume of fluid flowing through inserts 303 may be increased, while decreasing the volume of fluid flowing between second disc 302 and frame 306. Lip 304 may extend around second disc 302, thereby forming a continuous lip 304. In certain embodiments, lip angle α may be in a range between about 5 degrees and about 90 degrees. In other embodiments, lip angle α may be between about 10 degrees and about 80 degrees, while in still other embodiments, lip angle α may be in a range between about 20 degrees and about 60 degrees.

Figure 1:
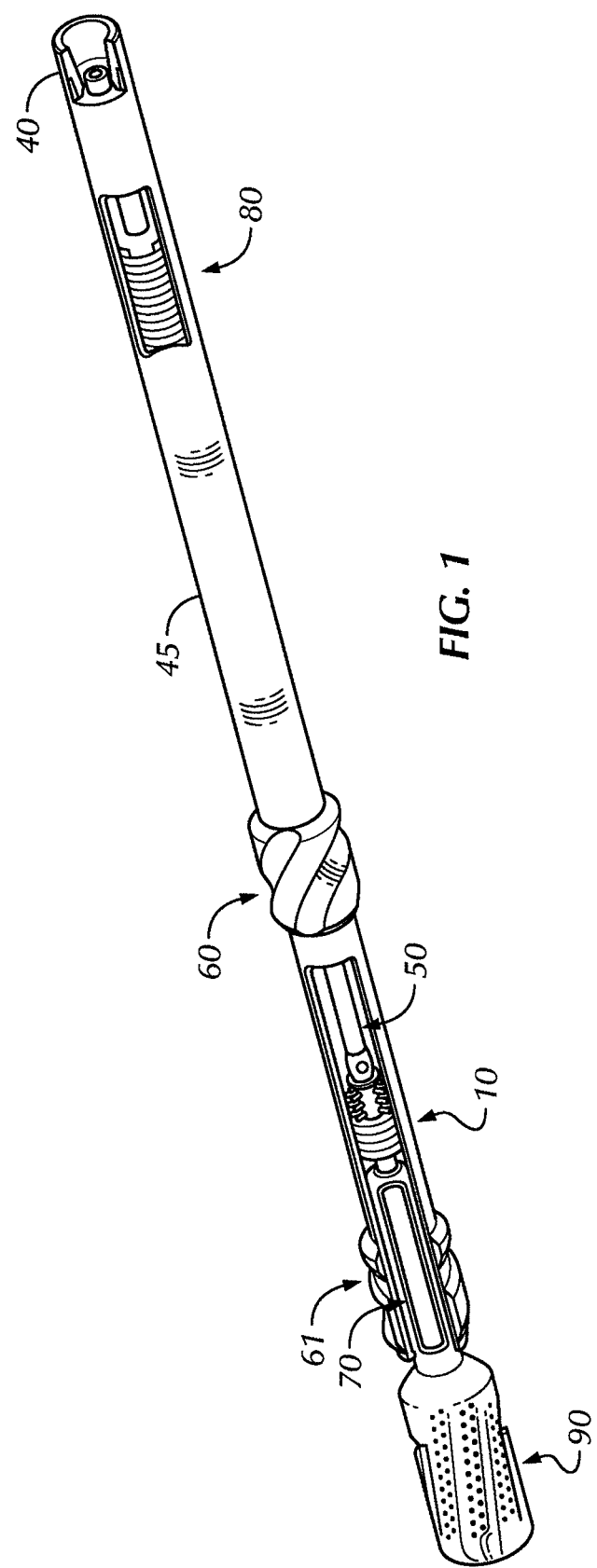
FIG. 1 is an assembly view of a conventional turbo drill.
Figure 2A:
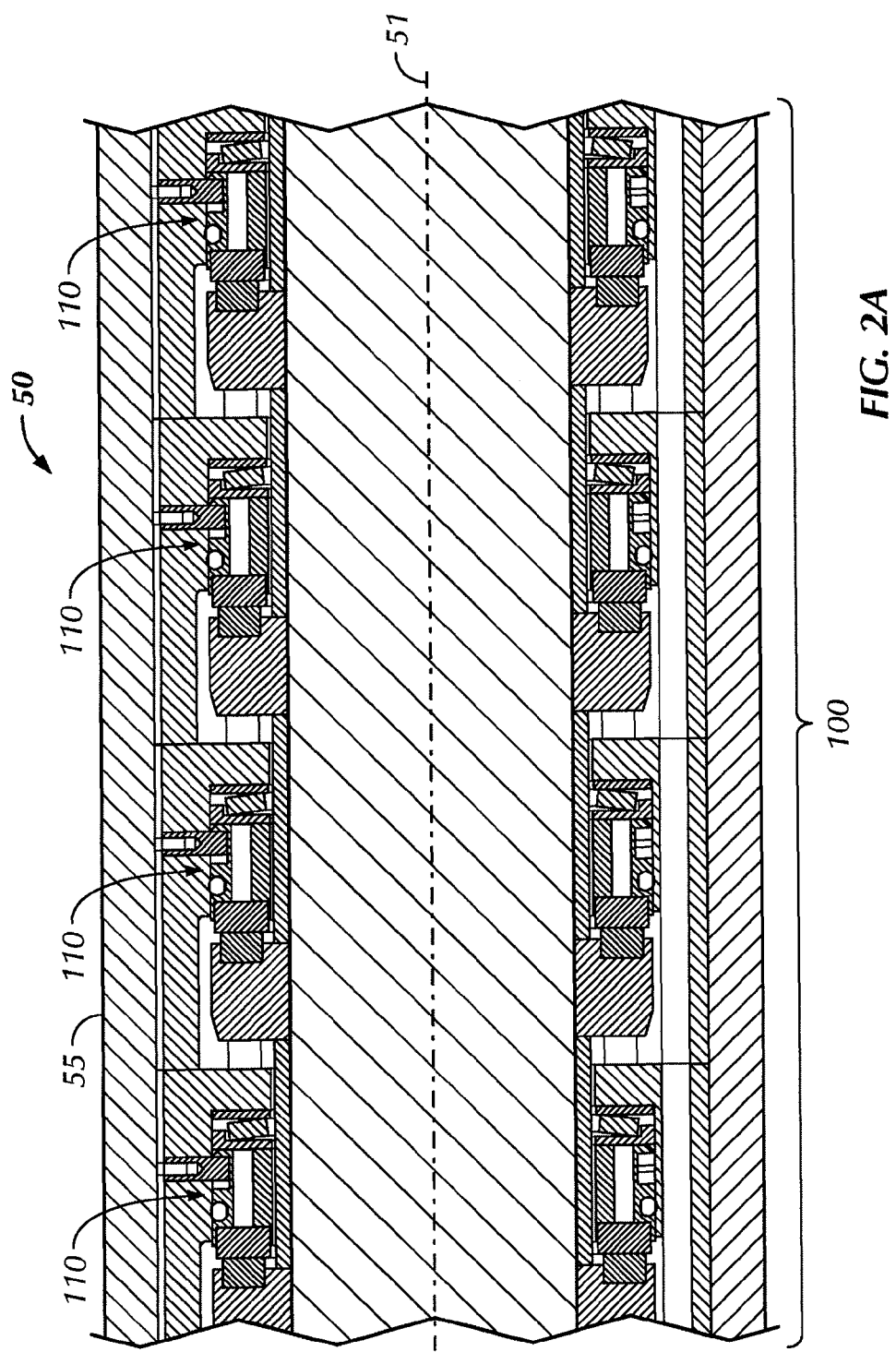
FIG. 2A is a section view of a multi-stage thrust bearing assembly.
Figure 2B:
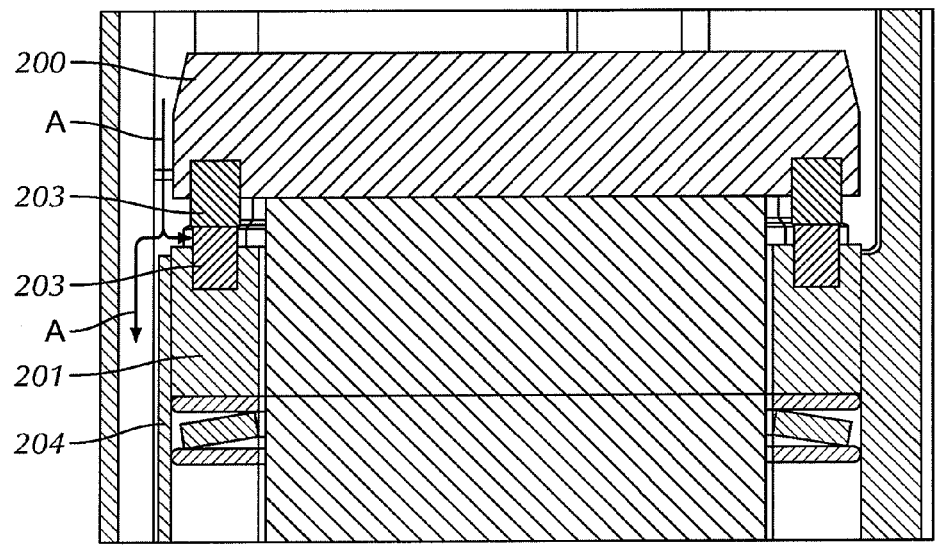
FIG. 2B is a cross-sectional view of a conventional bearing assembly.
Figure 2C:
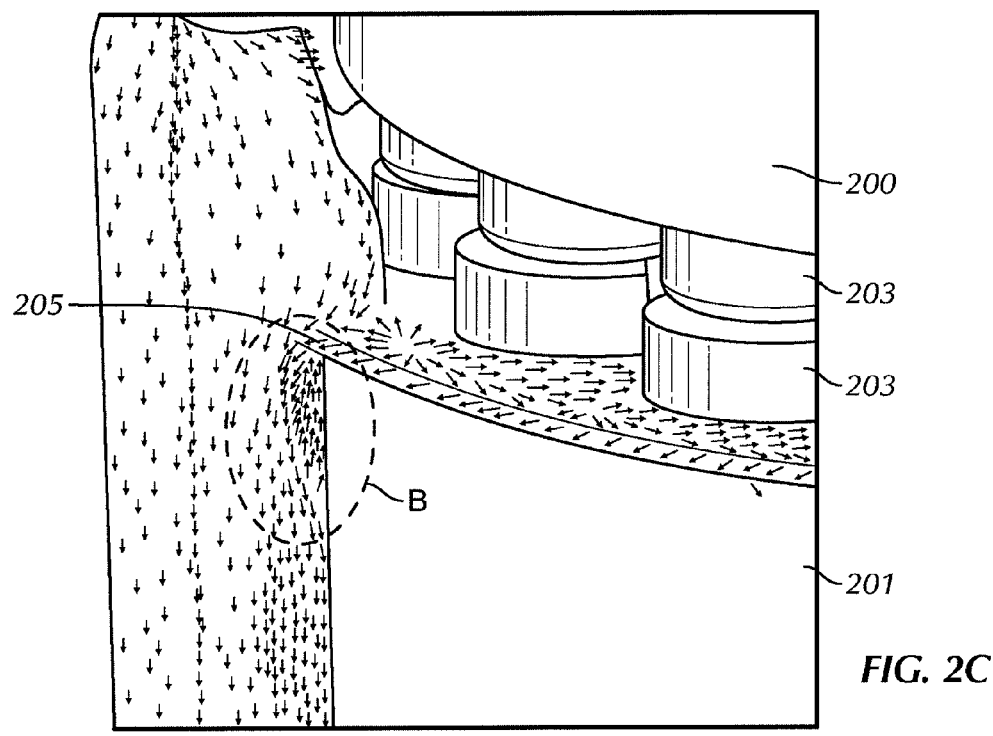
FIG. 2C is a fluid flow diagram of the bearing assembly of FIG. 2B.
Figure 3B:
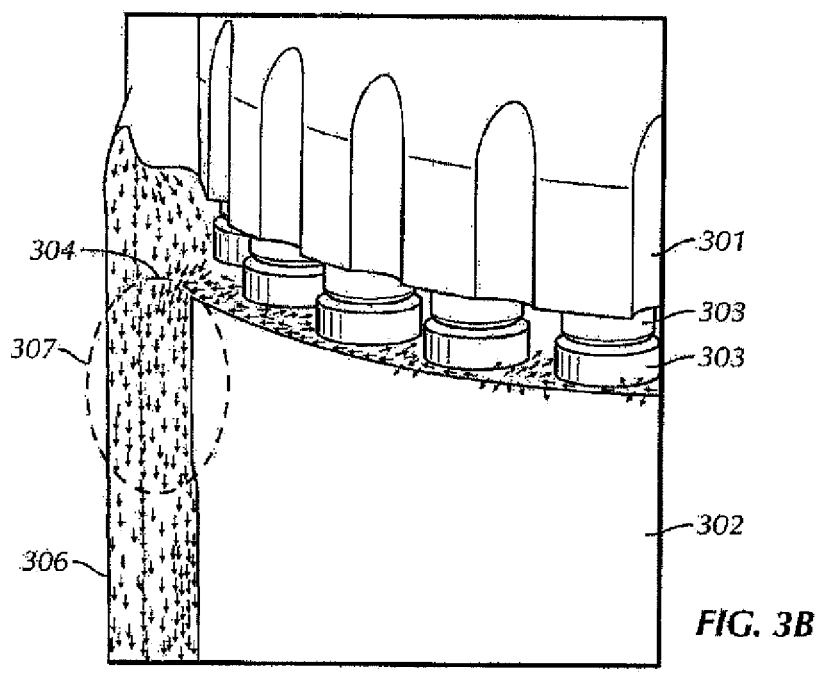
FIG. 3B is a fluid flow schematic of a bearing assembly according to embodiments of the present disclosure.

Referring briefly to FIG. 3B a fluid flow schematic of a bearing assembly having a lip is shown. As illustrated, fluid flowing between frame 306 and first disc 301 is directed over lip 304 and through inserts of wear resistant surfaces 303. Additionally, the fluid flow between second disc 302 and frame 306 is streamlined, and recirculation (i.e., fluid flowing back up second disc 302) (as illustrated in FIG. 2C) is minimized at portion 307. By decreasing the amount of recirculation, dead zones that may otherwise occur may be minimized, thereby keeping fluid flow through the ports (not individually shown), allowing fluid to continue flowing into other down hole components, which may include additional bearing assemblies. Recirculation is reduced because, as the fluid flow contacts lip 304, the flow velocity is decreased causing the flow to climb uphill along lip 304, which results in decreased overshoot of the fluid at the periphery of lip 304.

Inclusion of lip 304 may thereby promote fluid flow through inserts of wear resistant surfaces 303, as well as minimize flow recirculation. A fluid control feature, such as lip 304, may thereby be used when cooling of inserts of wear resistant surfaces 303 is an issue due to lack of sufficient fluid flow through the bearing components.

Figure 4A:
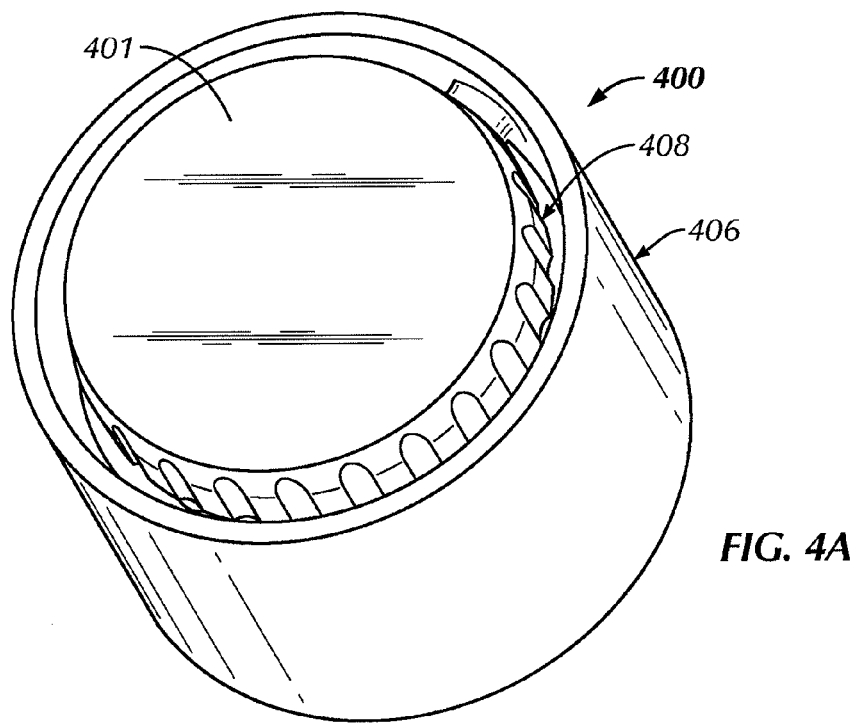
FIG. 4A is a top perspective view of a bearing assembly according to embodiments of the present disclosure.

Referring to FIG. 4A, a thrust bearing assembly according to embodiments of the present disclosure is shown. In this embodiment, thrust bearing assembly 400 includes a first disc 401 and a second disc (not illustrated). Both first disc 401 and the second disc have a plurality of inserts (not illustrated) disposed thereon. Both first disc 401 and the second disc are disposed in a frame 406.

In this embodiment, first disc 401 includes a plurality of grooves 408 formed above the inserts. The grooves 408 may have various geometries, such as, for example, circular, triangular, rectangular, square, and/or combinations thereof. Additionally, the grooves 408 may have sharp or round edges and/or may have chamfered edges. In FIG. 4A, grooves 408 may be axially aligned relative to a longitudinal axis of bearing assembly 400. However, in alternate embodiments, grooves 408 may be at an angle relative to the longitudinal axis of bearing assembly 400.

Figure 4B:
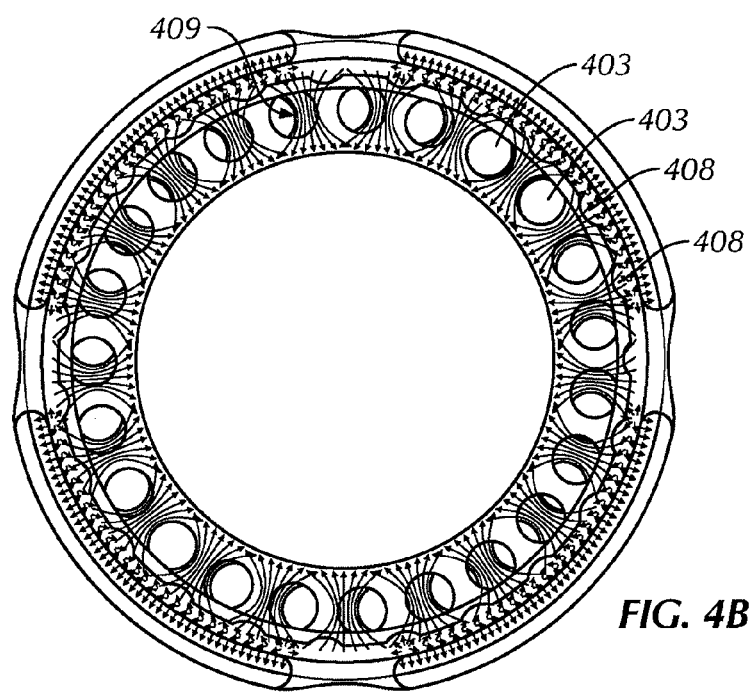
FIG. 4B is a fluid flow schematic of a bearing assembly according to the bearing assembly of FIG. 4A.

Referring to FIG. 4B, a fluid flow schematic of a bearing assembly according to the bearing assembly of FIG. 4A is shown. In FIG. 4B, a top cross-sectional view during computational fluid dynamics modeling allows the flow of fluid through a thrust bearing to be observed. As illustrated, grooves 408 may increase cross-flow in slots 409 between inserts 403. Increased fluid flow may thereby allow inserts 403 to be more effectively cooled during use, thereby decreasing the likelihood of premature failure of the thrust bearing. Those of ordinary skill in the art will appreciate that in alternative embodiments, grooves 408 may be aligned at an angle with respect to a longitudinal axis of the thrust bearing, thereby diverting fluid around the bearing components. Such a design may be beneficial to prevent erosion of bearing surfaces that may be caused by excessive fluid flowing through the bearing components.

Figure 5:
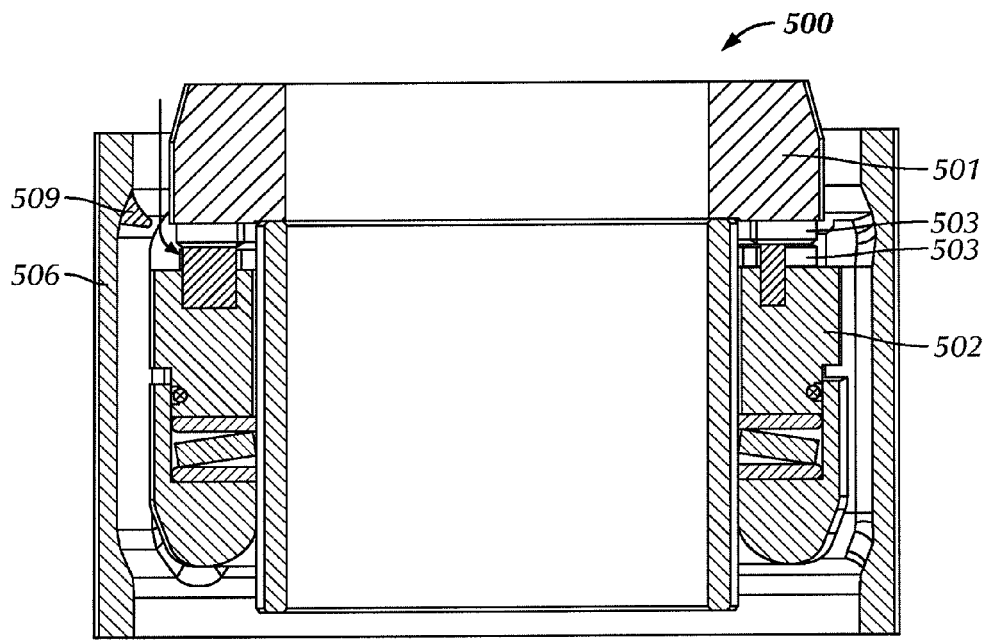
FIG. 5 is a cross-section view of a bearing assembly according to embodiments of the present disclosure.

Referring to FIG. 5 a thrust bearing assembly according to embodiments of the present disclosure is shown. In this embodiment, thrust bearing assembly 500 includes a first disc 501 and a second disc 502. Both first disc 501 and the second disc 502 have wear resistant surfaces 503 disposed thereon. As explained above, wear resistant surfaces 503 may include a plurality of inserts and or a substantially continuous sleeve. Both first disc 501 and the second disc 502 are disposed in a frame 506.

In this embodiment, frame 506 includes a blade protrusion 509 extending from the internal diameter of frame 506. Blade protrusion 509 may include various geometries, such as a crescent shaped geometry (e.g., an arcuate surface), thereby controlling the flow of fluid through various bearing components. Blade protrusion 509 having a crescent shaped geometry increases the flow of fluid through wear resistant surfaces 503, thereby providing increased cooling to the wear resistant surfaces 503. Those of ordinary skill in the art will appreciate that the angle of blade protrusion 509 may vary, thereby allowing for the flow of fluid to be controlled, which may further extend the operating life of thrust bearing 500. Additionally, blade protrusion 509 may be one continuous protrusion extending circumferentially around the entire frame 509, or may include protrusion segments that extend from a portion of the circumference of frame 509.

In certain embodiments, blade protrusion 509 may be formed to include an arcuate surface such as a continuous curve. Blade protrusion 509 may thus be formed by joining two tangency lines that are non-collinear, thereby forming a substantially continuous curve. In an alternate embodiment, blade protrusion 509 may be formed to include a substantially straight line. In such an embodiment, blade protrusion 509 may be formed by joining two tangency lines that are collinear.

Figure 6A:
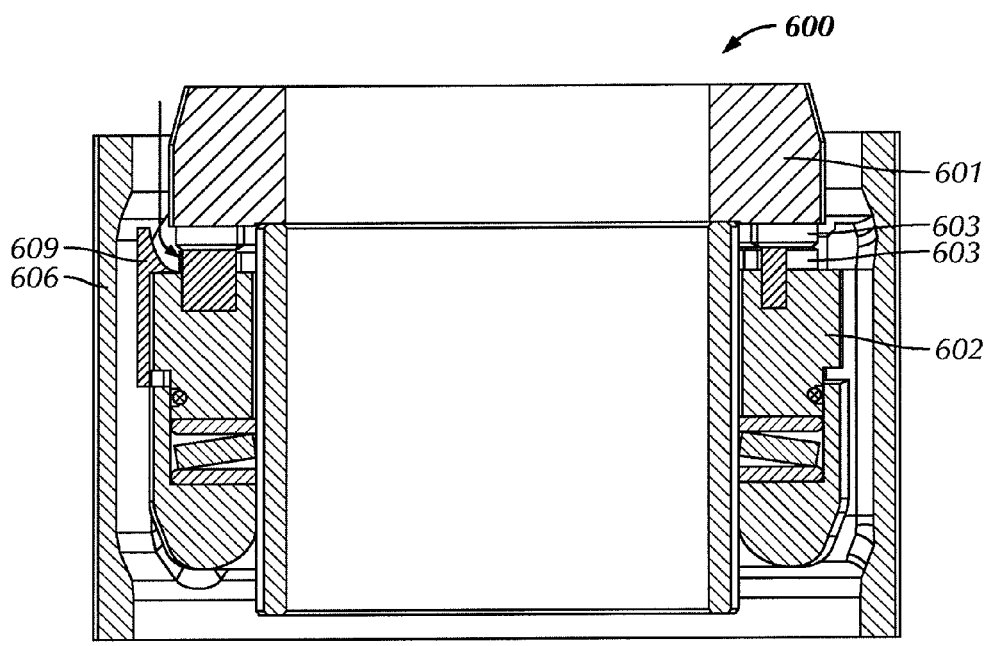
FIG. 6A is a cross-section view of a bearing assembly according to embodiments of the present disclosure.

Referring to FIG. 6A, a thrust bearing assembly according to embodiments of the present disclosure is shown. FIG. 6A, similar to FIG. 5, illustrates a thrust bearing assembly 600 having a first disc 601 and a second disc 602. Both first disc 601 and second disc 602 have a wear resistant surface 603 disposed thereon. Wear resistant surfaces 603 may include a plurality of inserts or a substantially continuous sleeve. Additionally, first disc 601 and the second disc 602 are disposed in a frame 606.

In this embodiment, second disc 602 further includes a blade protrusion 609. As with blade protrusion 509 of FIG. 5, blade protrusion 609 may promote the flow of fluid between bearing components, thereby providing greater cooling of the bearing components, during use. The location of blade protrusion 609 may be varied in order to change the amount of fluid flowing between bearing components 609. For example, by varying the angle of blade protrusion 609, or varying the location with respect to the outer diameter of second disc 602 and/or the inner diameter of frame 606, the amount of fluid flowing between bearing components may be adjusted. In certain embodiments, blade protrusion 609 may include an extended region that may be formed integrally with second disc 602, or alternatively, formed separately from blade protrusion 609 and affixed to second disc 602. In certain aspects, blade protrusion 609 is integral to frame 606.

Additionally, blade protrusion 609 may include various geometries, such as a crescent geometry. Those of ordinary skill in the art will appreciate that changing the geometry may promote the flow of fluid through the bearing components or otherwise prevent fluid recirculation or wear to bearing components.

Figure 6B:
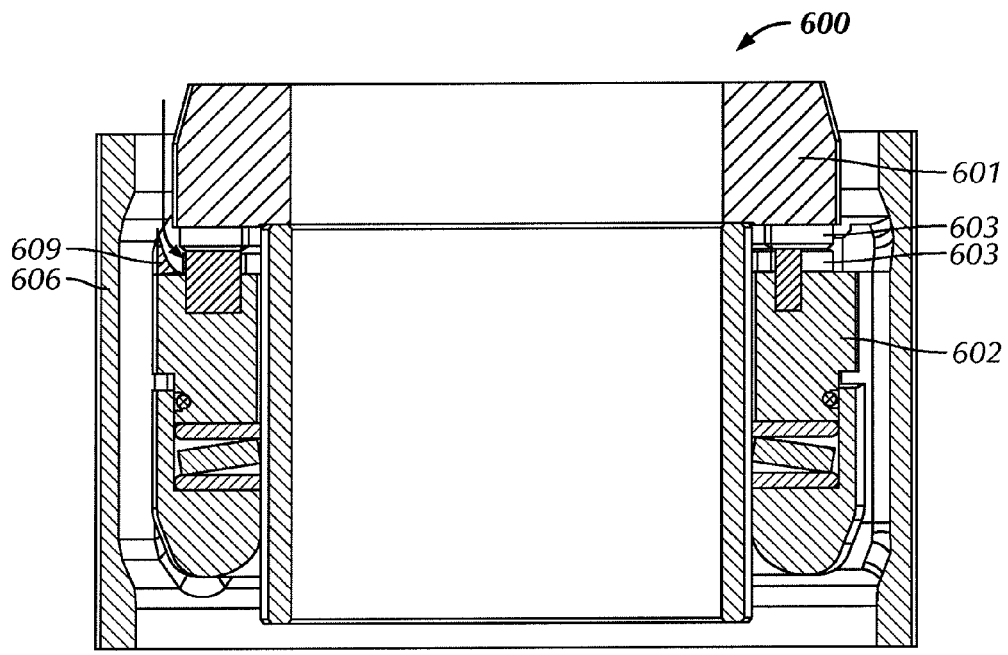
FIG. 6B is a cross-section view of a bearing assembly according to embodiments of the present disclosure.

Referring briefly to FIG. 6B, in certain embodiments, blade protrusion 609 may be formed to include an arcuate surface such as a continuous curve. Blade protrusion 609 may thus be formed by joining two tangency lines that are non-collinear, thereby forming a substantially continuous curve. In an alternate embodiment, blade protrusion 609 may be formed to include a substantially straight line. In such an embodiment, blade protrusion 609 may be formed by joining two tangency lines that are collinear.

Figure 7:
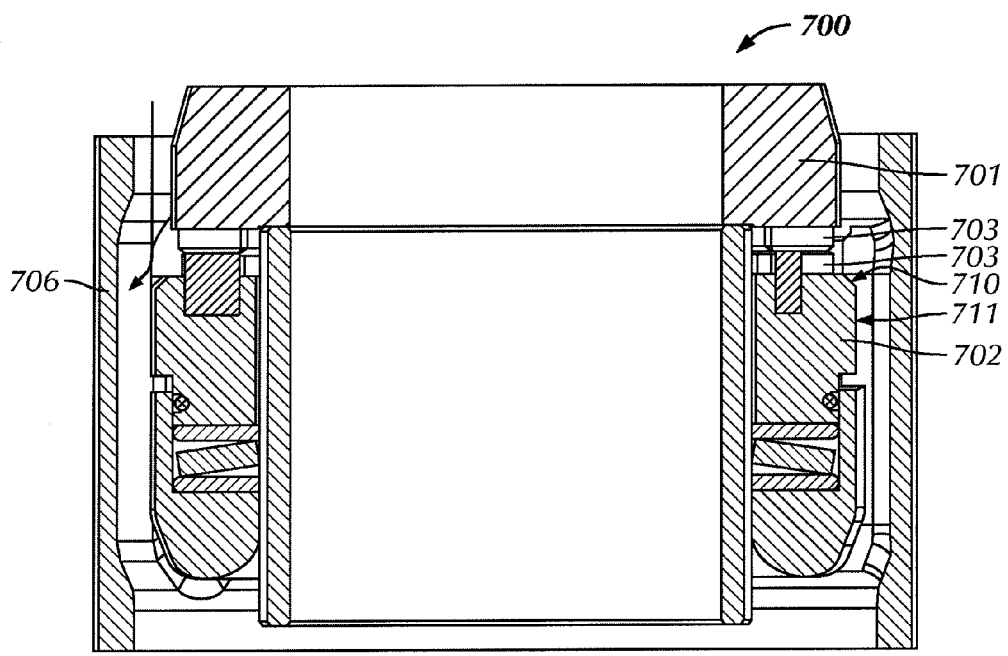
FIG. 7 is a cross-section view of a bearing assembly according to embodiments of the present disclosure.

Referring to FIG. 7, a thrust bearing assembly according to embodiments of the present disclosure is shown. FIG. 7 illustrates a thrust bearing assembly 700 having a first disc 701 and a second disc 702. Both first disc 701 and second disc 702 have a wear resistant surface 703 disposed thereon. Wear resistant surfaces 703 may include a plurality of inserts and/or a substantially continuous sleeve. Additionally, first disc 701 and the second disc 702 are disposed in a frame 706.

In this embodiment, second disc 702 may further include a chamfer 710 on the outer periphery thereof. Chamfer 710 may be included to increase the volume of fluid flowing into flow ports 711, located between second disc 702 and frame 706. By increasing the volume of fluid flowing into flow ports 711, the volume of fluid flowing through the load bearing surfaces (between a second wear resistant surface 703 of second disc 702 and a first wear resistant surface 703 of first disc 701) of the thrust bearing 700 may be decreased. Chamfer 710 may include various geometries, and in certain embodiments, may include an arcuate surface. Additionally, the angle of chamfer 710 may also be varied to adjust the volume of fluid flowing between thrust bearing components and/or into flow ports 710.

Figure 8:
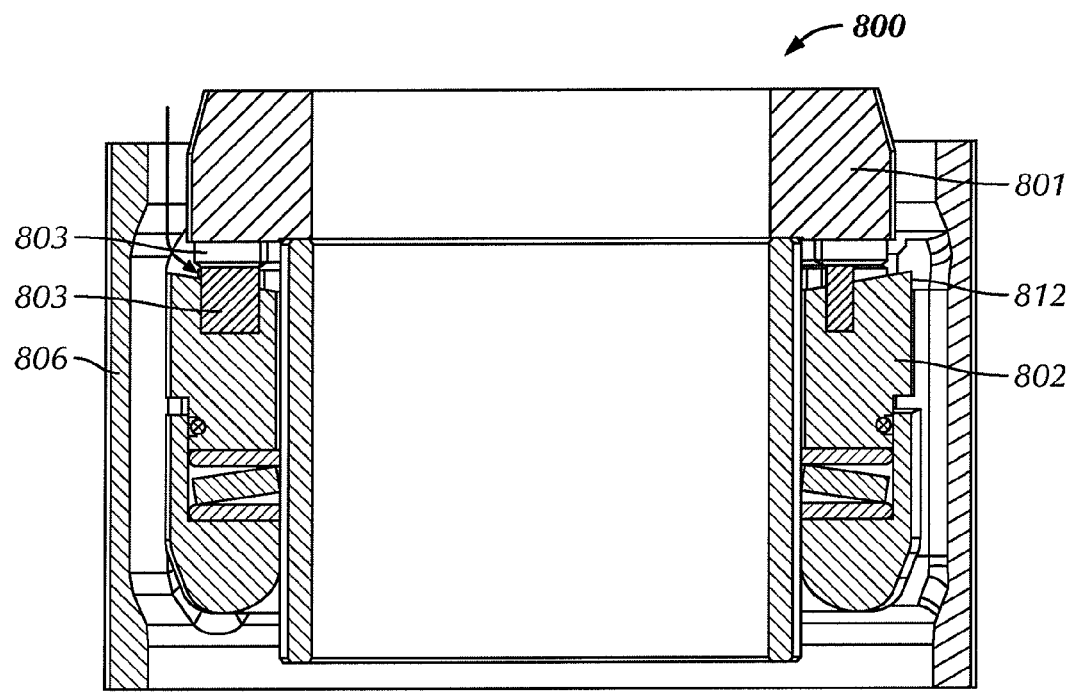
FIG. 8 is a cross-section view of a bearing assembly according to embodiments of the present disclosure.

Referring to FIG. 8, a thrust bearing assembly according to embodiments of the present disclosure is shown. FIG. 8 illustrates a thrust bearing assembly 800 having a first disc 801 and a second disc 802. Both first disc 801 and second disc 802 have a wear resistant surface 803 disposed thereon. As explained above, wear resistant surfaces 803 may include a plurality of inserts and/or a substantially continuous sleeve. Additionally, first disc 801 and the second disc 802 are disposed in a frame 806.

In this embodiment, second disc 802 may further include an inclined surface 812 extending from an outer diameter of second disc 802 to an inner diameter of second disc 802. The inclined surface 812 may thereby direct fluid flow through bearing components, enhancing the cooling effect of the fluid flow during use. Those of ordinary skill in the art will appreciate that the angle of inclined surface 812 may be varied in order to adjust the volume of fluid flowing through thrust bearing components. Additionally, inclined surface 812 may include various geometric features, such as arcuate surfaces, ridges (not shown), or other varying surface features to further control the flow of fluid therethrough. Inclined surface 812, as illustrated, is inclined from an outer diameter of second disc 802 to an inner diameter of second disc 802. In alternative embodiments, the inclination may occur over a portion, such as an area between the outer diameter of second disc 802 and wear resistant surfaces 803, or may include various inclined portion and flat portions.

Figure 9:
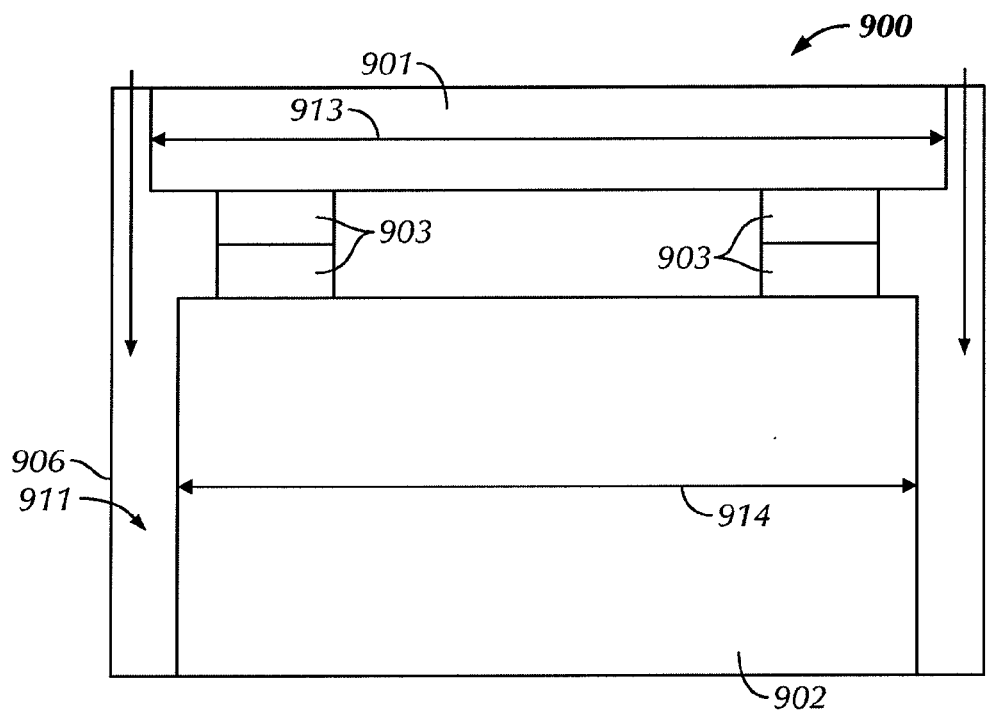
FIG. 9 is a cross-section view of a bearing assembly according to embodiments of the present disclosure.

Referring to FIG. 9, a thrust bearing assembly according to embodiments of the present disclosure is shown. FIG. 9 illustrates a thrust bearing assembly 900 having a first disc 901 and a second disc 902. Both first disc 901 and second disc 902 have a wear resistant surface 903 disposed thereon. Wear resistant surfaces 903 may include a plurality of inserts and/or a substantially continuous sleeve. Additionally, first disc 901 and the second disc 902 are disposed in a frame 906.

In this embodiment, an outer diameter 913 of first disc 901 is larger than an outer diameter 914 of second disc 902. By increasing outer diameter 913 of first disc 901 relative to an outer diameter 914 of second disc 902, flow may be directed to flow ports 911 located between second disc 902 and frame 906. Diverting the flow of fluid through flow ports 906 may decrease erosion through thrust bearing components, thereby preventing the premature failure of the thrust bearing components. Those of ordinary skill in the art will appreciate that the relative outer diameters of first disc 901 and second disc 902 may be varied in order to adjust the relative volume of fluid flowing into flow ports 906 or through the bearing components.

Figure 10A:
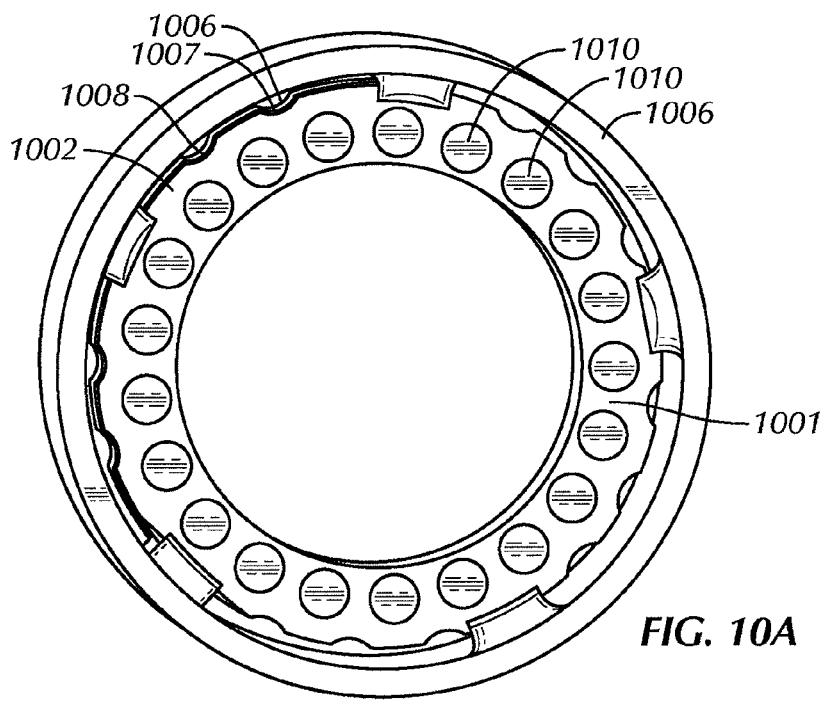
FIG. 10A is a cross-section view of a bearing assembly according to embodiments of the present disclosure.
Figure 10B:
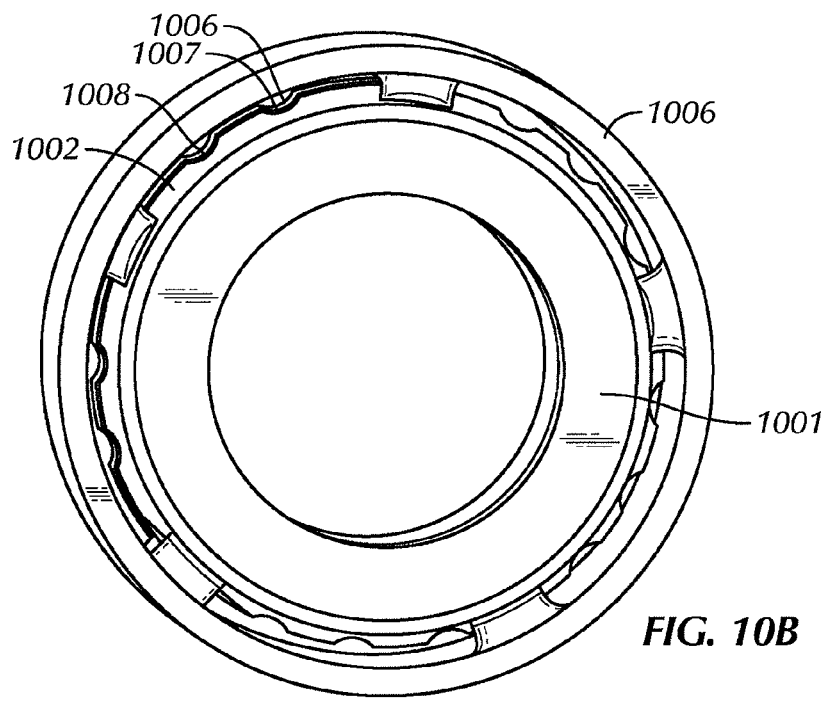
FIG. 10B is a top view of a bearing assembly according to embodiments of the present disclosure.
Figure 10C:
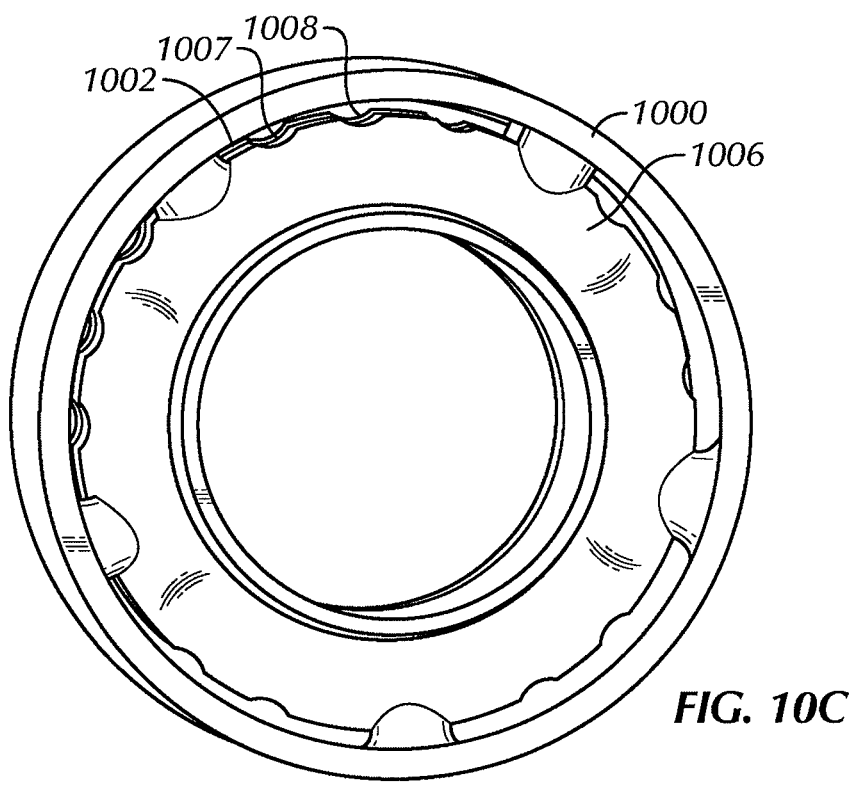
FIG. 10C is a bottom view of a bearing assembly according to embodiments of the present disclosure.

Referring to FIGS. 10A-10C, multiple views of thrust bearing assemblies according to embodiments of the present disclosure are shown. FIG. 10A illustrates a thrust bearing assembly cross-section, the cross-section taken between the intersection of a first (rotating) disc (not shown) and a second (fixed) disc 1002. FIG. 10B illustrates a thrust bearing assembly top view and FIG. 10B illustrates a thrust bearing assembly bottom view.

In this embodiment, the thrust bearing assembly has a first rotating disc 1001 and the second fixed disc 1002. The second fixed disc 1002 includes a wear resistant surface 1003 including plurality of inserts 1010, disposed thereon. As explained above, first rotating disc 1001 also includes a wear resistant surface that may include a plurality of inserts or a substantially continuous sleeve, depending on the requirements of a particular operation. The thrust bearing assembly also includes a frame 1006.

In this embodiment, second fixed disc 1002 includes a first plurality of grooves 1007. Additionally, frame 1006 includes a second plurality of grooves 1008. As illustrated, the first and second pluralities of grooves correspond to one another. Those of ordinary skill in the art will appreciate that various fluid control features may be combined, and as such, grooves 107 and 18 may be present on the frame 1006 and second disc 1002, or alternatively or in addition to the first disc 1001.

Generally, embodiments of the present disclosure include thrust bearing designs having various fluid control features. Examples of fluid flow control features may include, for example, the presence on thrust bearing assembly of a lip, an inclined surface, a groove, a blade protrusion, a chamfer, and/or relative diameter of a first rotating disc to a second fixed disc.

In certain embodiments, thrust bearing assemblies in accordance with the present disclosure may have more than one fluid flow control feature. For example, in one aspect, a thrust bearing may have a groove on a first disc and a lip on a second disc, while in an alternate aspect, the thrust bearing may have a groove on a first disc and an inclined surface on a second disc.

During the design of thrust bearing assemblies in accordance with embodiments of the present disclosure, various aspects of the thrust bearings may be simulated and/or modeled in a computational fluid dynamics simulator in order to optimize the design of the thrust bearing assembly. For example, in such a computer assisted method for designing thrust bearings, an operator may initially input thrust bearing parameters. Thrust bearing parameters may include, for example, outer diameter of a second disc, outer diameter of a first disc, inner diameter of a second disc, inner diameter of a first disc, material properties of the first disc or second disc, properties of a wear resistant surface, the number of inserts forming a wear resistant surface, a material property of the wear resistant surface, a diameter of the wear resistant surface, the orientation of the wear resistant surface relative to one another, a frame outer diameter, a frame inner diameter, a flow port diameter, a groove geometry, a groove angle, a blade protrusion geometry, a lip geometry, a chamfer geometry, and an inclined top surface angle of the second disc.

With the model of the thrust bearing assembly inputted, a computational flow dynamics model is generated through simulation of the thrust bearing assembly. The results of the computational flow dynamics model is analyzed to determine the flow of fluid through the thrust bearing, including, for example, a flow rate, a cross-flow potential, fluid pooling, etc. Additionally, the model is analyzed to determine the erosion potential at various positions on the thrust bearing, including, for example, on the first disc, on the second disc, and between inserts of the relative wear resistant surfaces.

After the analyzing, at least one parameter of the thrust bearing assembly is adjusted to affect a flow control feature. The thrust bearing assembly is then resimulated and readjusted until an optimized flow is achieved. Optimized fluid flow refers to, for example, a balance of fluid flow to cool components of the thrust bearing during operation and erosion of thrust bearing assembly components. Depending on the design of the thrust bearing, optimization may further refer to a thrust bearing assembly that does not experience erosion or have cooling issues that result in premature failure of the thrust bearing during normal flow conditions.

Advantageously, embodiments of the present disclosure may provide thrust bearing assemblies that have enhanced fluid flow designs. In one aspect, such thrust bearing assemblies may have enhanced fluid flow, thereby allowing for more effective cooling of thrust bearing assembly components while decreasing the erosion typically caused by high fluid flow through thrust bearing assembly components. Also advantageously, embodiments, of the present disclosure may provide thrust bearing assembly design methods that may allow for the optimization of thrust bearings for a particular application.

Also advantageously, embodiments, of the present disclosure may provide thrust bearing assembly designs that have multiple flow control features, such as lips, inclined surfaces, grooves, chamfers, blade protrusions, etc. Because such embodiments may include multiple fluid control features, a balance may be achieved between erosion and cooling of the thrust bearing assembly components.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A bearing assembly comprising:
   a frame;
   a first disc disposed in the frame, the first disc including a first face having a first wear resistant surface; and
   a second disc disposed in the frame, the second disc including a second face having a second wear resistant surface, wherein the second wear resistant surface is configured to interact with the first wear resistant surface, and
   wherein the first face includes a lip protruding from the first face at a lip angle, the lip angle defined between the lip and a line perpendicular to the first face and being in the range between about 5 degrees and about 80 degrees.

2. The bearing assembly of claim 1, wherein the first disc further comprises at least one groove disposed above the wear resistant surface.

3. The bearing assembly of claim 1, wherein the frame comprises a blade protrusion.

4. The bearing assembly of claim 1, wherein the second disc further comprises a chamfer on the outer periphery of the second disc.

5. A bearing assembly comprising:
   a frame;
   a first disc disposed in the frame, the first disc including a first wear resistant surface and a first inclined surface defined by a first angle of inclination; and
   a second disc disposed in the frame, the second disc including a second wear resistant surface, wherein the second wear resistant surface is configured to interact with the first wear resistant surface, and a second inclined surface defined by a second angle of inclination, wherein the second angle of inclination of the second disc is different than the first angle of inclination of the first disc.

6. The bearing assembly of claim 5, wherein the fluid control feature comprises an outer diameter of the first disc that is smaller than an outer diameter of the second disc.

7. The bearing assembly of claim 5, wherein at least one of the first and second wear resistant surfaces comprises at least one selected from a group consisting of a plurality of inserts and a substantially continuous sleeve.

8. The bearing assembly of claim 5, wherein at least one of the first and second wear resistant surfaces comprises at least one of a ceramic, polycrystalline diamond, and carbide.

9. The bearing assembly of claim 5, wherein at least one of the frame and the second disc has a fluid control feature further including a blade protrusion disposed on at least one of the frame and the second disc.

10. The bearing assembly of claim 9, wherein the blade protrusion comprises at least one of a straight line curvature and a substantially continuous curvature.

* * * * *